(12) United States Patent
Dain et al.

(10) Patent No.: US 10,614,037 B2
(45) Date of Patent: Apr. 7, 2020

(54) OPTIMIZED DEDUPLICATED OBJECT STORAGE SYSTEM

(71) Applicant: INTERNATIONAL BUSINESS MACHINES CORPORATION, Armonk, NY (US)

(72) Inventors: Joseph W. Dain, Vail, AZ (US); Itzhack Goldberg, Hadera (IL); Gregory T. Kishi, Oro Valley, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 15/475,540

(22) Filed: Mar. 31, 2017

(65) Prior Publication Data
US 2018/0285379 A1    Oct. 4, 2018

(51) Int. Cl.
G06F 17/00 (2019.01)
G06F 16/174 (2019.01)
H04L 29/06 (2006.01)
H04L 29/08 (2006.01)

(52) U.S. Cl.
CPC ...... G06F 16/1748 (2019.01); G06F 16/1744 (2019.01); H04L 67/1097 (2013.01); H04L 69/04 (2013.01)

(58) Field of Classification Search
CPC ............ G06F 16/1748; G06F 16/1744; H04L 67/1097; H04L 60/04
USPC .................................................. 707/600–899
See application file for complete search history.

(56) References Cited

U.S. PATENT DOCUMENTS

| | | | |
|---|---|---|---|
| 9,395,923 B1 * | 7/2016 | Pandolfo | G06F 11/00 |
| 2008/0243769 A1 | 10/2008 | Arbour et al. | |
| 2010/0036887 A1 | 2/2010 | Anglin et al. | |
| 2013/0060739 A1 | 3/2013 | Kalach et al. | |
| 2016/0042008 A1 | 2/2016 | Tripathy et al. | |
| 2016/0267098 A1 | 9/2016 | Mallaiah et al. | |
| 2017/0193003 A1 | 7/2017 | Vijayan et al. | |

* cited by examiner

*Primary Examiner* — Isaac M Woo
(74) *Attorney, Agent, or Firm* — Griffiths & Seaton PLLC (57) ABSTRACT

Embodiments for optimized deduplicated object storage system by one or more processors. An uncompressed and non-deduplicated copy of an object may be stored on a node in a distributed object storage system and one or more compressed and deduplicated copies of the uncompressed and non-deduplicated copy of the object may be distributed on one or more alternative nodes in the distributed object storage system.

17 Claims, 10 Drawing Sheets

OPTIMIZED DEDUPLICATED OBJECT STORAGE SYSTEM

BACKGROUND OF THE INVENTION

Field of the Invention

The present invention relates in general to computing systems, and more particularly to, various embodiments for optimizing a deduplicated object storage system by one or more processors.

Description of the Related Art

In today's society, computer systems are commonplace. Computer systems may be found in the workplace, at home, or at school. As computer systems become increasingly relied upon, convenient, and portable, the Internet has grown exponentially. Now more than ever, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments for an optimized deduplicated object storage system by one or more processors, are provided. In one embodiment, by way of example only, a method for optimizing a deduplicated object storage system, again by one or more processors, is provided. An uncompressed and non-deduplicated copy of an object may be stored on a node in a distributed object storage system and one or more compressed and deduplicated copies of the uncompressed and non-deduplicated copy of the object may be distributed on one or more alternative nodes in the distributed object storage system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

A storage management system may employ a number of different methods to perform storage operations on electronic data. For example, data may be deduplicated or compressed. Data deduplication refers to the reduction and/or elimination of redundant data. In data deduplication, a data object, which may be a file, a data stream, or some other form of data, is broken down into one or more parts called sub-blocks. In a data deduplication process, duplicate copies of data are reduced or eliminated, leaving a minimal amount of redundant copies, or a single copy of the data, respectively. Data compression may reduce the size of a file by eliminating redundant data within the file. A compressed file may be a smaller file than the original file and may consume less disk space than the original file. For example, a 700 Kilobyte (KB) text file may be compressed to a 52 KB file by substituting certain long character strings with shorter representations. Decompression algorithms may be used to recreate the original file from the compressed file. Data compression may be performed on other data structures besides files, such as, directories.

In one aspect, a storage system may use object storage ("object-based storage"), which is a storage architecture that manages data as objects, as opposed to other storage architectures like file systems which manage data as a file hierarchy and block storage which manages data as blocks within sectors and tracks. Each object may include the data itself, a variable amount of metadata, and a globally unique identifier. Object storage can be implemented at multiple levels, including the device level (object storage device), the system level, and the interface level. In each case, object storage enables capabilities not addressed by other storage architectures, like interfaces that can be directly programmable by the application, a namespace that can span multiple instances of physical hardware, and data management functions like data replication and data distribution at object-level granularity.

As strides in technological advancement relating to data access devices have been accomplished, there is an ever-growing demand for increasing computation time relating to data storage while simultaneously reducing the cost of data storage such as, for example, by leveraging a deduplication operation while enhancing object storage architecture to create an optimized, deduplicated object storage architecture.

Accordingly, various embodiments are provided for optimizing deduplicated object storage system by one or more processors. In one embodiment, by way of example only, a method for optimizing deduplicated object storage system, again by one or more processors, is provided. An uncompressed and non-deduplicated copy of an object may be stored on a node in a distributed object storage system and one or more compressed and deduplicated copies of the uncompressed and non-deduplicated copy of the object may be distributed on one or more alternative nodes in the distributed object storage system.

Said differently, the present invention provides for maintaining multiple copies of data in an object storage subsystem, storing a single uncompressed and non-deduplicated copy on a first server, using a compute in the first server to deduplicate and compress the copy, and sending the deduplicated and compressed copy to one or more remote servers, thus saving transmission bandwidth and storage savings. A load balancing operation may be used and employed to manage the distribution of non-deduplicated and uncompressed and deduplicated and compressed copies across N servers, where "N" is a predetermined/defined value or a positive integer. Upon a read operation, the present invention may favor/prefer reading the non-deduplicated, non-compressed copy while measuring a load, and adjusting during runtime to create additional non-deduplicated and non-compressed copies on additional nodes to provide a proper (e.g., a defined) read balancing (and remove the additional copies as read load is decreased). As such, creating the non-deduplicated, non-compressed copies on additional nodes does not require any bandwidth transfer as the deduplicated and compressed copy local to the server can be expanded to allow the preferencing of "local" undeduplicated and uncompressed copies if network transfer times between nodes are significantly different. The present invention may allow the undeduplicated copy to be compressed if the decompression performance is high enough (e.g., greater than a predefined threshold or percentage) so as avoid slowing down the rate the undeduplicated copy can be read.

In one aspect, the present invention provides a solution for optimizing object accessing/reading operations in object based storage systems by storing/writing a non-deduplicated copy of an object on a first server and distributing deduplicated and compressed copies of the object to one or more remote servers for reducing cost of storage and bandwidth. More specifically, the present invention reduces data transfer by first transferring data (e.g., primary data or "original" data) of a deduplicated copy of the data and then transferring subsequent deduplicated copies which requires only deduplicated data.

In one aspect, objects may be written to N copies (e.g., N is equal to 3 or "N=3") on separate storage entities, where "N" is a selected value or positive integer. N−1 of the data copies may be deduplicated and one copy is not deduplicated. With N copies, there may also be N different storage entities.

The undeduplicated copy of objects may be distributed among the N storage entities to prevent each of the undeduplicated copies from being stored on a single storage entity. In one example, a "round-robin" operation may be used while other operations that leverage the object pool information to distribute the undeduplicated copy may be used. It should be noted that the undeduplicated copy may optionally be compressed but remain undeduplicated (e.g., non-deduplicated, compressed copy).

The present invention provides one or more advantages, such as, for example, enhanced efficiency for object storage systems while decreasing storage costs. Consider the following example illustrating one or more advantages. If an amount of objects being stored is "X" (e.g., "X" being a selected value or positive integer), and 3 copies are stored and maintained, the traditional just a bunch of disks "JBOD", which is an inexpensive storage solution, requires 3X storage. Assume that if a reasonable deduplication ratio is 10:1 and an average of 11 generations of data, the objects require X(original generation)+10(generations) *1/10(deduplication)=2X per 10 generations or X/5 per generation. The total storage requirement for the 3 copies is therefore X(undeduplicated copy)+2(additional copies)*X/5(size per deduplicated generation)=1.4X. This is less than half the storage required by the 3X traditional copies of the JBOD, which is extremely inexpensive storage.

Since most deduplication engines are capable of compression, even if they are not deduplicating, a compression operation may be applied to the undeduplicated copy and the storage requirement changes to X/2(undeduplicated)+2*X/5=0.9X. This is less than ⅓ (one third) the storage required by the 3X traditional copies.

In one aspect, performance on an object recall operation may be managed by altering the object access operation to read the undeduplicated copy. This allows the user to access a version of the file that has not been additionally fragmented by the deduplication process. In this manner, the present invention maintains increased/high performance object access while reducing storage costs. At large sizes (e.g., cloud computing), a major use of power and cooling will be the disk drives while reducing the power and cooling of one or more deduplication servers and/or object management servers. Additional savings from power and cooling over JBOD can be realized, as well as reliability improvements from having less moving parts.

Additionally, the mechanisms of the embodiments provide for dynamically modifying a non-deduplicated copy behavior. In one aspect, a user may configure a setting that may deduplicate the non-deduplicated copy of the data if it has not been accessed for a selected period of time (e.g., one or more days) and/or may have indicated which copies of data to deduplicate or not. Similarly, one or more copies of objects may each be deduplicated and a full copy can be created to optimize/increase performance if X number of accesses per second occur, which may also be configurable by the user, wherein X may be a selected value or positive integer.

Thus, as described herein, in an object store itself, the present invention may retain one copy of data non-deduplicated, compress and deduplicate additional copies of the data, and then send the deduplicated and compressed copies to one or more alternative nodes within the object store. The present invention further provides for load balancing, expanding and contracting additional non-deduplicated copies to address bursting situations.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
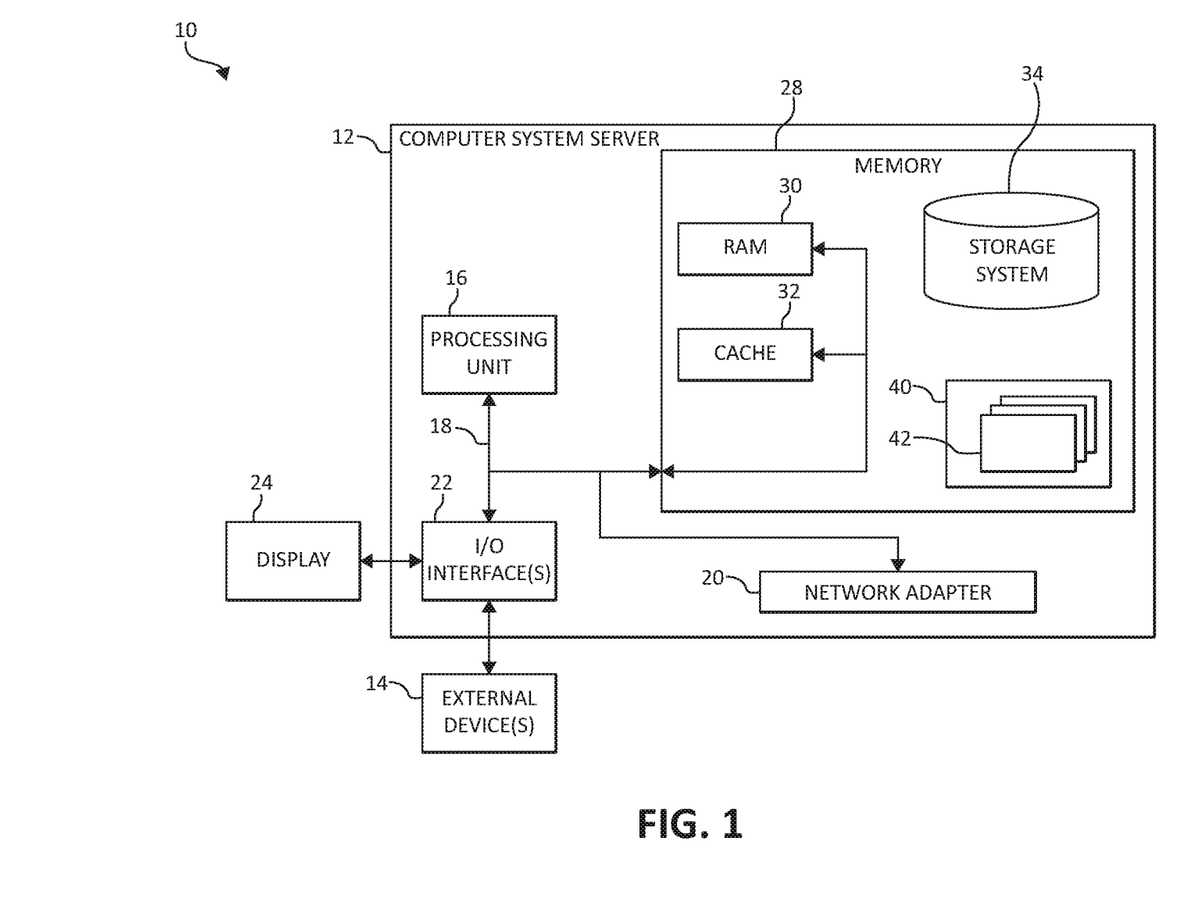
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
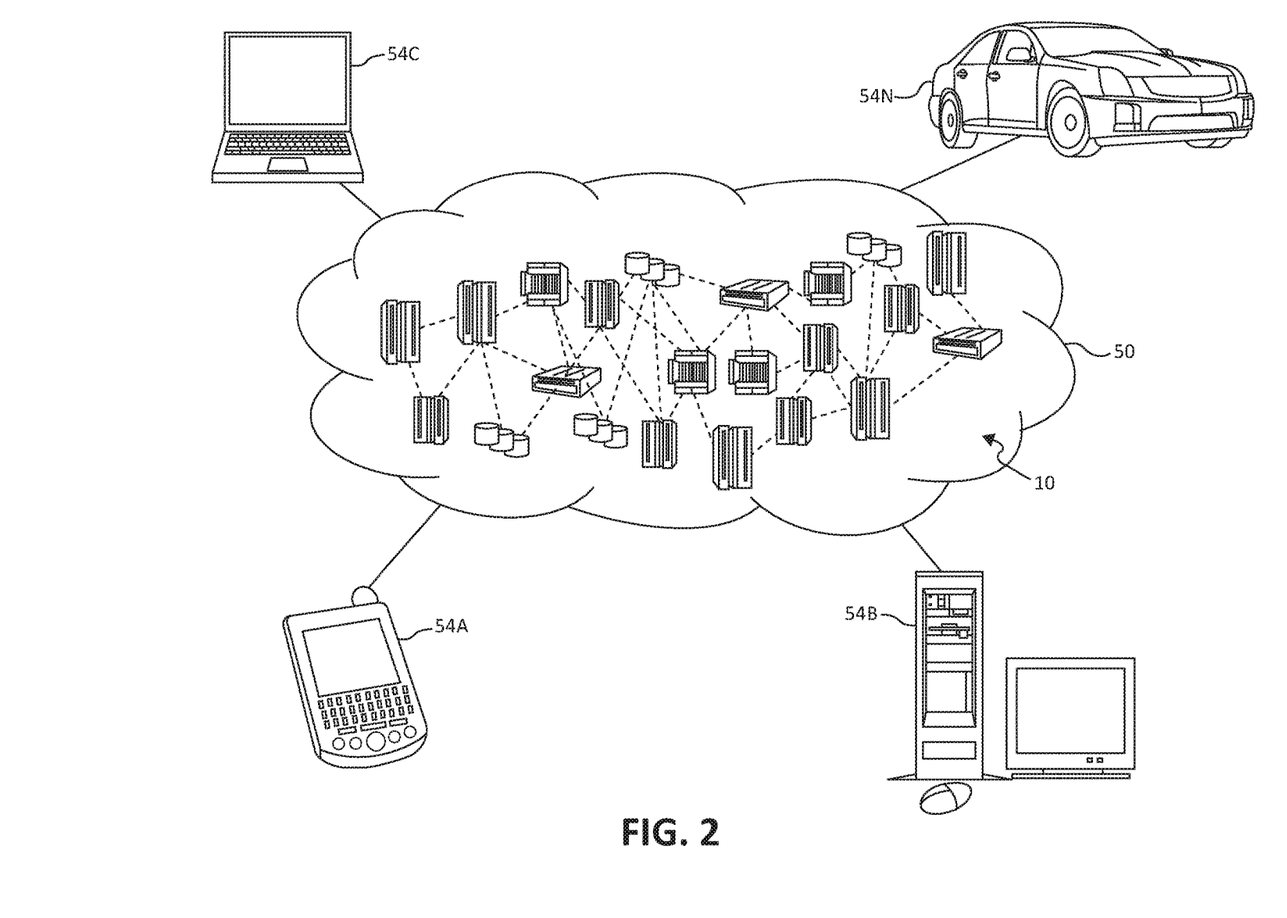
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
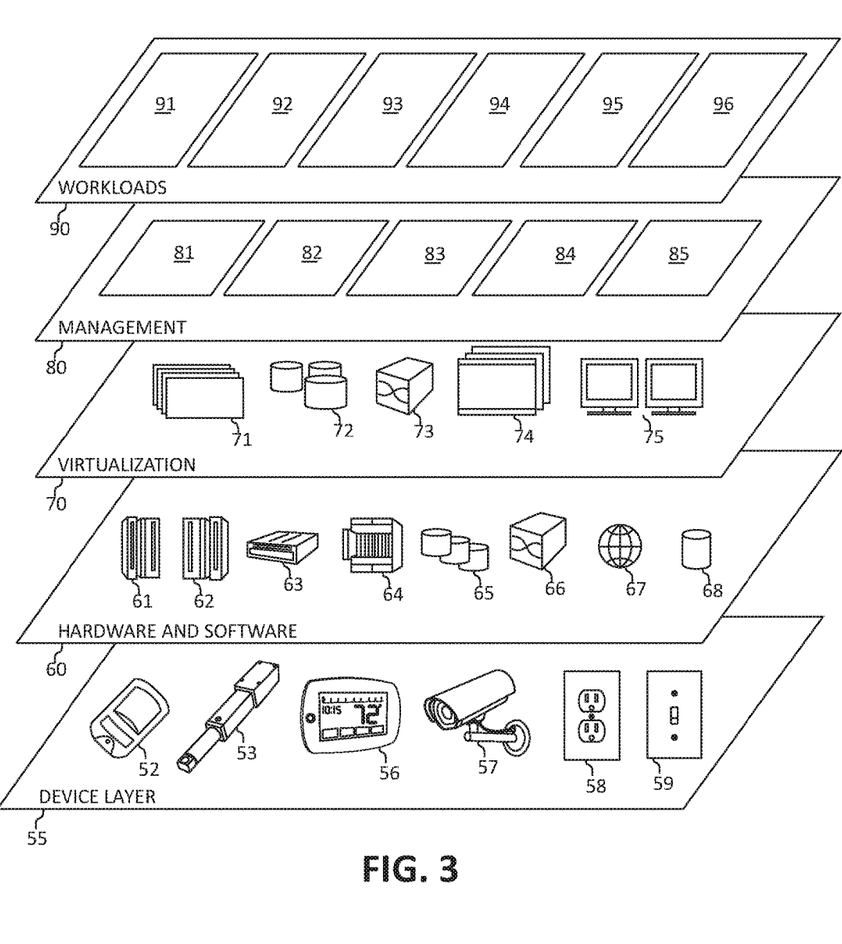
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various optimizing deduplicated object storage system workloads and functions 96. In addition, optimizing deduplicated object storage system workloads and functions 96 may include such operations as data analytics, data analysis, and as will be further described, notification functionality. One of ordinary skill in the art will appreciate that the optimizing deduplicated object storage system workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
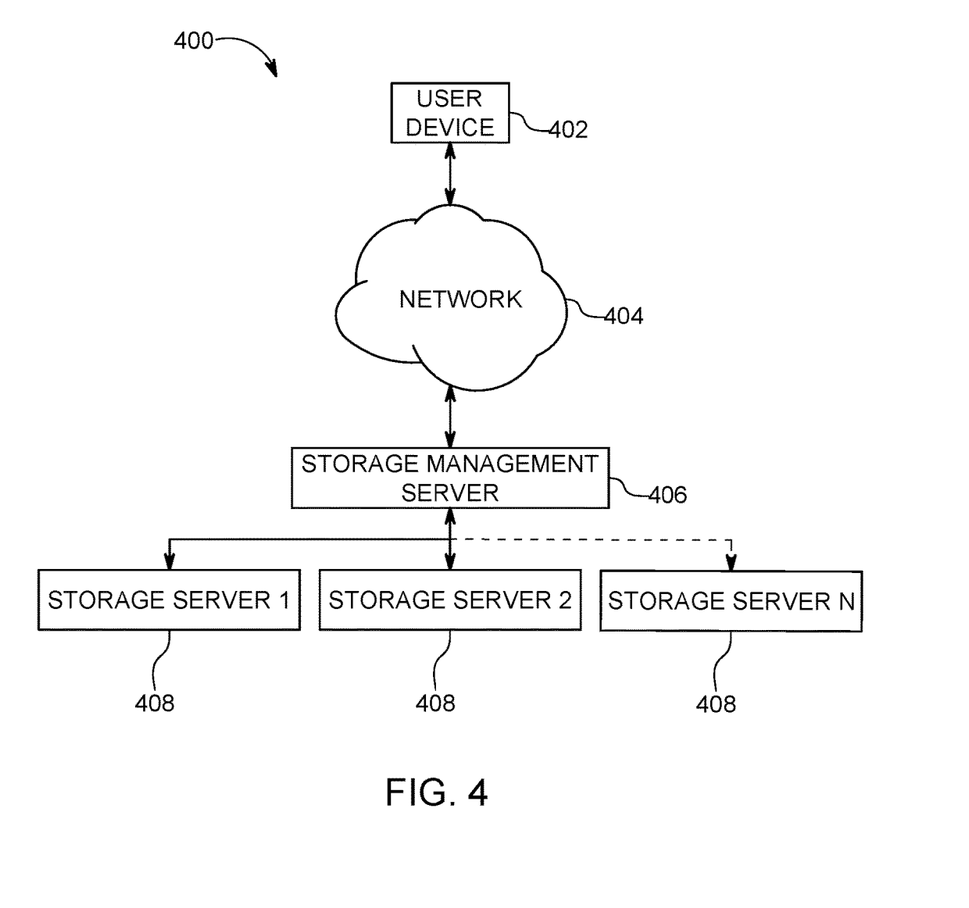
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 12 and memory 28 of FIG. 1 may be employed in FIG. 4 to perform various computational, data processing, storage and other functionality in accordance with various aspects of the present invention.

Referring now to FIG. 4, a file storage system 400 is illustrated. The file storage system 400 may include a user device 402 connected to a network 404 such as, for example, a Transport Control Protocol/Internet Protocol (TCP/IP) network (e.g., the Internet.) A storage management server 406 may be connected to the network 404 and to a plurality of storage servers 408. While only one user device has been illustrated as connected to the network 404 for clarity of discussion, one of skill in the art will recognize that a plurality of user devices may, and typically will, be connected to the network 404. While only one storage management server coupled to a plurality of storage servers has been illustrated as connected to the network 404 for clarity of discussion, one of skill in the art will recognize that a plurality of storage management servers, each connected to a plurality of storage servers may, and typically will, be connected to the network 404. Each user device 402 and the storage management server 406 includes a respective network interface for communicating with the network 404 (e.g., outputting information to, and receiving information from, the network 404).

Each of the user device 402, storage management server 406, and the plurality of storage servers 408 (e.g., storage servers 1, 2, and N, where N is a "Nth" number of storage servers) may include a respective information processing system, a subsystem, or a part of a subsystem for executing processes and performing operations (e.g., processing or communicating information). An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art.

As previously mentioned, the mechanisms of the illustrated embodiments provide novel approaches for optimizing a deduplicated object storage system. In one aspect, the present invention maintains one or more copies of data in an object storage subsystem. A single uncompressed and non-deduplicated copy is stored, maintained, and/or kept on a first server, using a compute operation in the first server to deduplicate and compress the uncompressed and non-deduplicated copy. The deduplicated and compressed copy may be sent to one or more remote servers, thus saving transmission bandwidth and storage savings.

Figure 5:
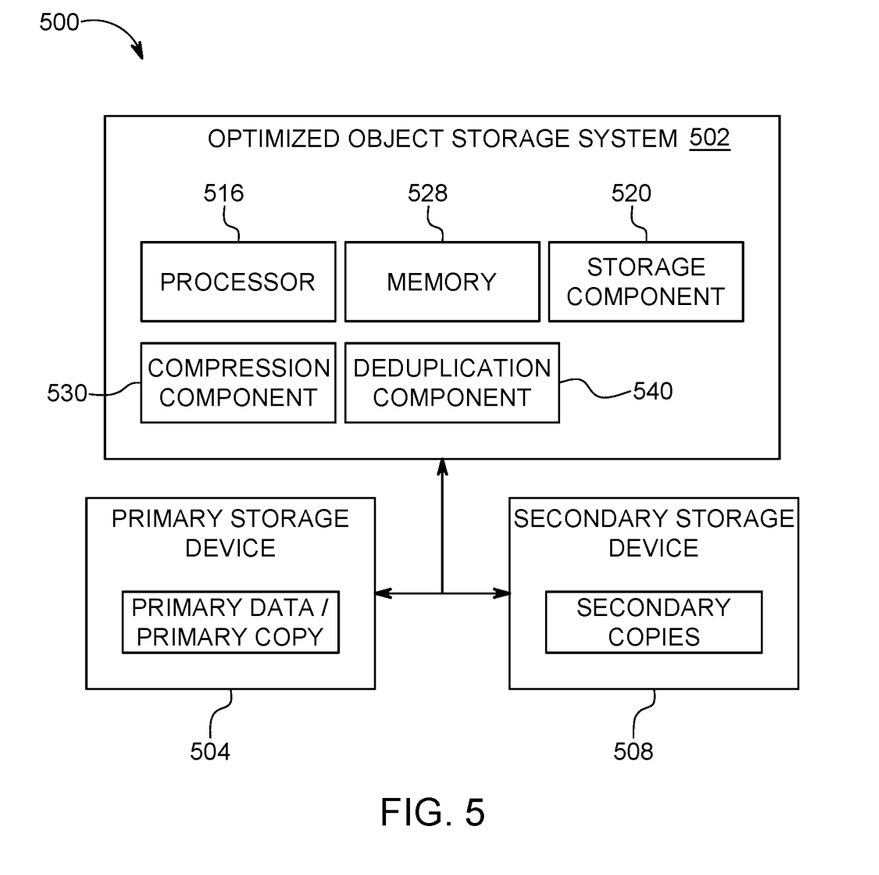
FIG. 5 is an additional block diagram depicting various user hardware and computing components functioning in accordance with aspects of the present invention.

Turning now to FIG. 5, a block diagram depicting exemplary functional components 500 according to various mechanisms of the illustrated embodiments, is shown. As shown, the various functionality, or "modules" of functionality, hardware devices, and/or other components in the same descriptive sense as has been previously described in FIGS. 1-4 may be included in FIG. 5. For example, processing unit 12 and memory 28 of FIG. 1 may be employed in FIG. 5 to perform various computational, data processing, storage and other functionality in accordance with various aspects of the present invention.

The system 500 may include functional components such as an optimized object storage system 502 (e.g., an optimized deduplication storage system), having a processing unit 516 and memory 528, each of which may work in communication with each other. The optimized object storage system 502 may also include a storage component 520, a compression component 530, and a deduplication component 540.

The optimized object storage system 502 (or a "distributed object storage system") may be in communication with one or more storages devices, servers, and/or systems such as, for example, node 504 and remote/alternative node(s) 508. The optimized object storage system 502 may determine performance capabilities, functions, services, and/or other functionality of each node 504 and remote/alternative node(s) 508. Additionally, in one aspect, the optimized object storage system 502 may be located internal and/or external to each node 504 and/or remote/alternative node(s) 508, depending on design preference and/or configuration capabilities.

In one aspect, the storage component 520 may store an uncompressed and non-deduplicated copy of an object on a node, such as node 504, in a distributed object storage system. The storage component 520, in conjunction with the compression component 530 and/or deduplication component 540, may also create, generate, and/or assist in creating one or more compressed and deduplicated copies of the uncompressed and non-deduplicated copy of the object that may be distributed on one or more alternative nodes in the distributed object storage system.

The storage component 520 may also transfer and/or provide a signal to transfer (e.g., signal the primary storage devices) the uncompressed and non-deduplicated copy of the object to a server prior to transferring the one or more compressed and deduplicated copies of the uncompressed and non-deduplicated copy of the object to the one or more remote servers in the distributed object storage system. The storage component 520 may manage the uncompressed and non-deduplicated copy and the one or more compressed and deduplicated copies across the distributed object storage system using a load balancing operation. A number of the one or more compressed and deduplicated copies may be increased by the storage component 520 upon detecting an unbalance load, and/or a number of the one or more compressed and deduplicated copies may be decreased upon detecting an unbalance load.

The uncompressed and non-deduplicated copy of an object may be used as a priority over the one or more compressed and deduplicated copies upon network transfer times differing between each of a plurality of nodes (e.g., the node 504 and/or alternative/remote node 508) in the distributed object storage system. The uncompressed and non-deduplicated copy may be compressed using the compression component 530 if a decompression rate is such that a rate for reading the uncompressed and non-deduplicated copy is maintained.

The deduplication component 540 may deduplicate the uncompressed and non-deduplicated copy of the object if the uncompressed and non-deduplicated copy of the object is not accessed during a predetermined time period. The storage component 520, in conjunction with the compression component 530 and/or the deduplication component 540, may create the one or more compressed and deduplicated copies of the uncompressed and non-deduplicated copy of the object upon detecting the uncompressed and non-deduplicated copy of the object is accessed at least N number of times during a selected time period, wherein N may be a selected value, number, or positive integer.

In one aspect, there may be at least 3 copies of the data (e.g., an "original" or primary copy and 2 deduplicated copies of each object) maintained, stored, and/or created. A first deduplicated copy may require a transfer of the original data. Also, each subsequent deduplicated transfer may only require a deduplicated data transfer such as, for example, transferring each compressed and/or deduplicated copy to/from a first node 504 to one or more alternative/remote nodes 508. This reduction in data transfer improves the overall data transfer in the combined storage and/or allows the addition of additional deduplicated copies at a reduced "cost".

When maintaining multiple copies of data in an object storage subsystem, a single uncompressed and non-deduplicated copy may be stored on a first server such as, for example node 504. Using a compute function in the first server to deduplicate and compress the copy (e.g., via the compression component 530 and/or deduplication component 540), the deduplicated and compressed copy may be sent to one or more remote servers such as, for example, remote/alternative nodes 508, thus saving transmission bandwidth and storage savings.

As mentioned, the storage component 520 may employ a load balancing algorithm to manage the distribution of non-deduplicated and uncompressed and deduplicated and compressed copies across N servers. Upon a read operation, reading the non-deduplicated, non-compressed copy may be preferred or favored (over the deduplicated and compressed copies) while measuring the load and adjusting the load during a runtime to create additional non-deduplicated and non-compressed copies on additional nodes to provide proper read balancing (and remove the additional copies as read load is decreased). That is, reading, as a preferential priority, "local" undeduplicated and uncompressed copies (stored on node 504 for example) may be performed if network transfer times between nodes (e.g., from node 504 to remote/alternative nodes 508) are different such as, for example, within a defined range of allowable transfer times or outside a range of allowable differences of transfer times. In one aspect, the undeduplicated copy may be compressed (via the compression component 530) if the decompression performance is high enough (e.g., which may be above a decompression performance threshold or limit) that does not slow down or decrease the rate that the undeduplicated copy on the node 504 can be read.

Figure 6A:
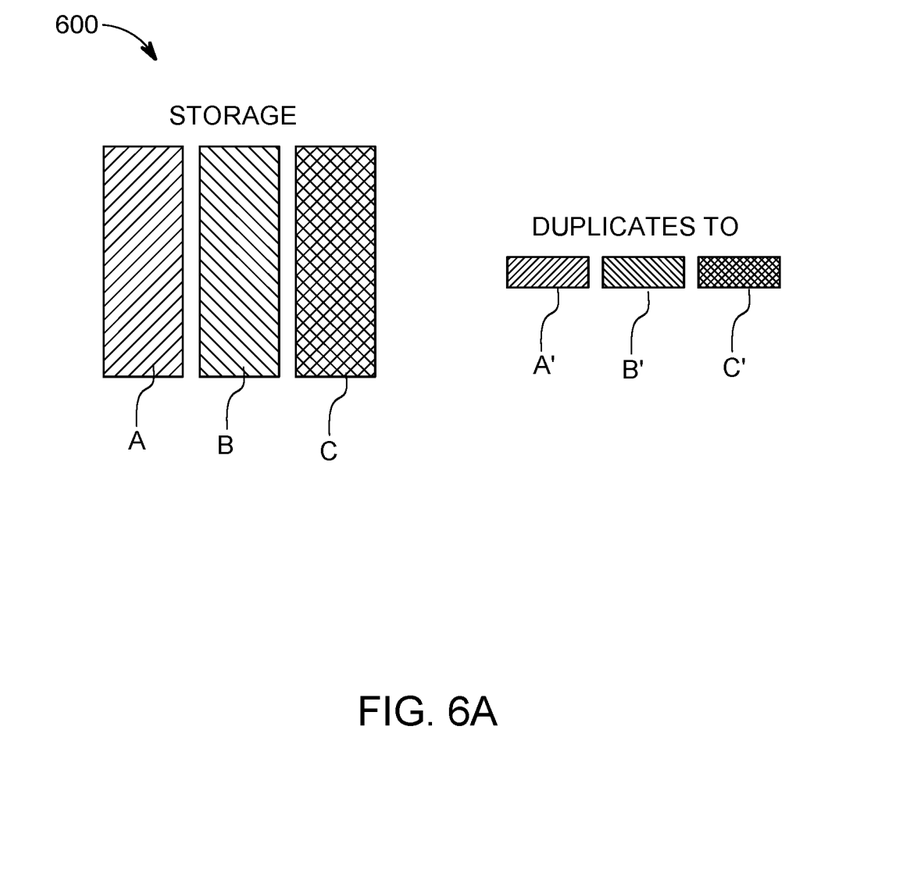
FIG. 6A-6C is an additional block diagram depicting exemplary convex polytopes based on initial media access policy settings and desired media access policy settings in which aspects of the present invention may be realized.
Figure 6B:
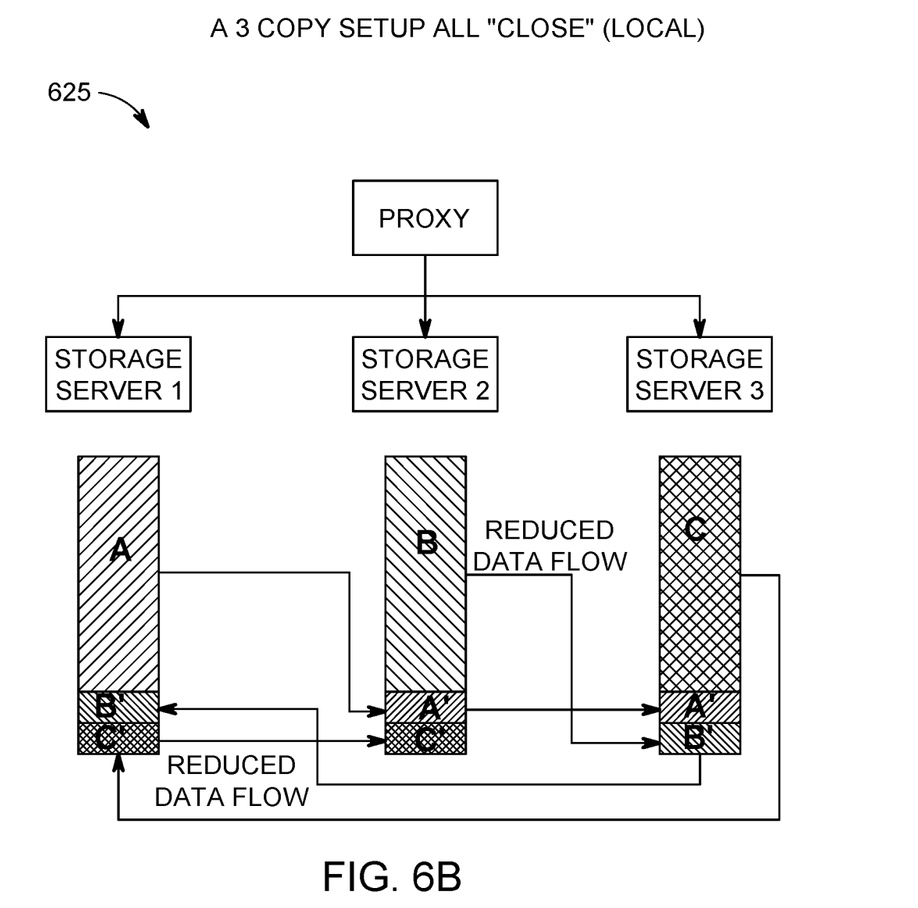
Figure 6C:
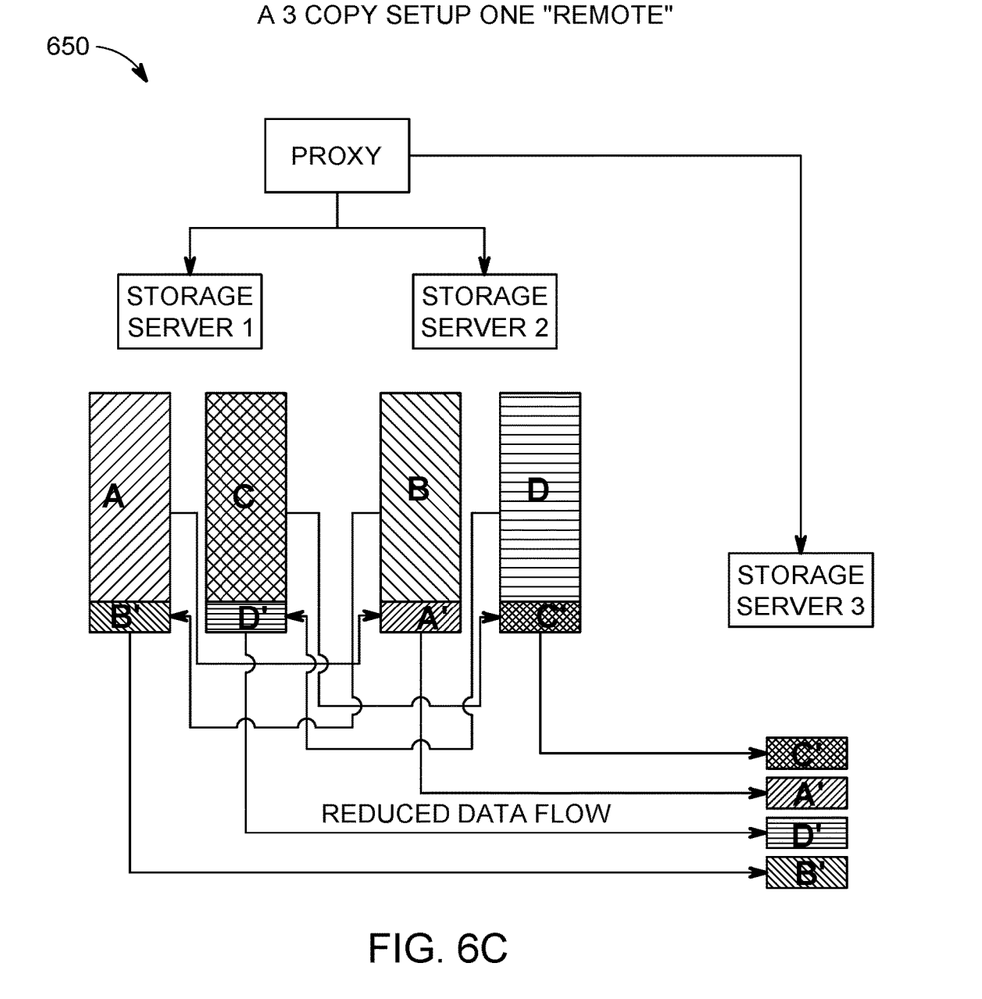

Turning now to FIGS. 6A-6C, additional diagrams illustrating various sample bandwidth reductions due to the optimized object storage system as described herein. For example, FIG. 6A shows a sample reduction due to deduplication. FIG. 6A shows deduplication coordination (e.g., pattern coordination) where the data A, shown as deduplication coordination data A, deduplicates to a smaller amount of data shown as deduplication coordination data A', where the data B, shown as deduplication coordination data B, deduplicates to a smaller amount of data shown as deduplication coordination data B', and the where the data C, shown as deduplication coordination data C, deduplicates to a smaller amount of data shown as deduplication coordination data C'.

FIG. 6B depicts an example where each storage server is "close" from a network standpoint (e.g., a 3 copy setup where the servers are close to the network). That is, a "proxy" may be directly connected to one or more servers (e.g., storage server 1, storage server 2, and storage server 3). Arrows from the data in the various servers show a sequence of copies where the 2nd deduplicated copy has a reduced data transfer (e.g., reduced data flow). Again, using the same deduplication patterns of FIG. 6A, data A, shown as deduplication coordination data A, deduplicates to a smaller amount of data shown as deduplication coordination data A', where the data B, shown as deduplication coordination data B, deduplicates to a smaller amount of data shown as deduplication coordination data B', and the where the data C, shown as deduplication coordination data C, deduplicates to a smaller amount of data shown as deduplication coordination data C'.

FIG. 6C illustrates a remote storage server with two "local" servers to illustrate the case where use of "local" undeduplicated and uncompressed copies is preferred if network transfer times between nodes are significantly different. That is, a "proxy" may be remotely connected to one or more servers (e.g., storage server 1, storage server 2, and storage server 3). More specifically, storage server 1 and storage server 2 may be local servers and directly connected to the proxy while storage server 3 may be remotely connected to the proxy. Arrows from the data in the various servers show a sequence of copies where the 2nd deduplicated copy has a reduced data transfer (e.g., reduced data flow). The remote storage server (e.g., storage server 3) with the two "local" servers (e.g., storage server 1 and storage server 2) illustrates the scenario for allowing the preferencing of "local" undeduplicated and uncompressed copies to be used if network transfer times between nodes are significantly different. It should be noted that the storage and rules can be modified to significantly reduce the data flow on the long transfer link.

Again, using the same deduplication patterns of FIG. 6A, data A, shown as deduplication coordination data A, deduplicates to a smaller amount of data shown as deduplication coordination data A', where the data B, shown as deduplication coordination data B, deduplicates to a smaller amount of data shown as deduplication coordination data B', and the where the data C, shown as deduplication coordination data C, deduplicates to a smaller amount of data shown as deduplication coordination data C'.

Figure 7:
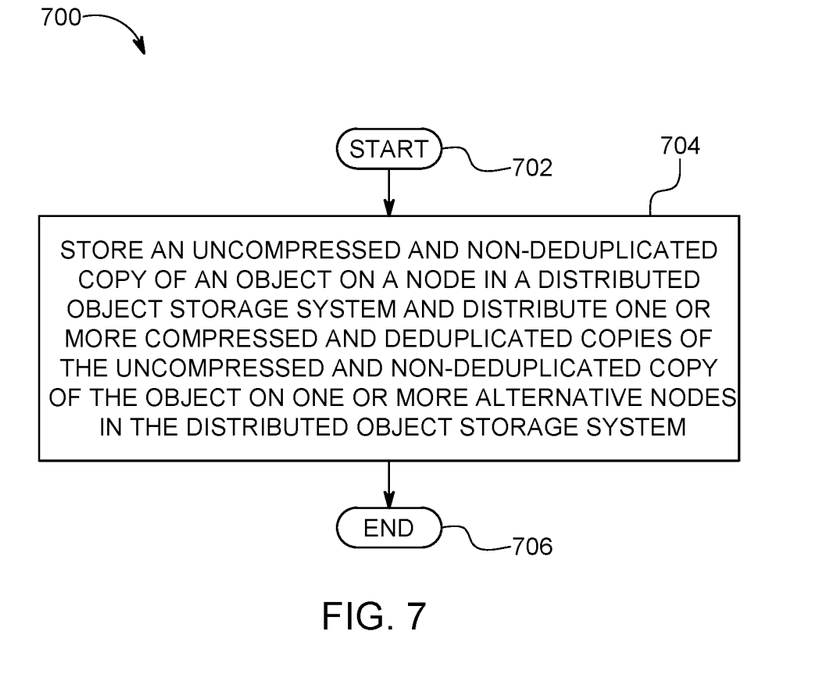
FIG. 7 is a flowchart diagram depicting an additional exemplary method for optimizing a deduplicated object storage system by one or more processors, again in which aspects of the present invention may be realized.

Turning now to FIG. 7, a method 700 for optimizing an object storage system by one or more processors is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. An uncompressed and non-deduplicated copy of an object may be stored on a node in a distributed object storage system and one or more compressed and deduplicated copies of the uncompressed and non-deduplicated copy of the object may be distributed on one or more alternative nodes in the distributed object storage system, as in block 704. The functionality 700 may end, as in block 706.

Figure 8:
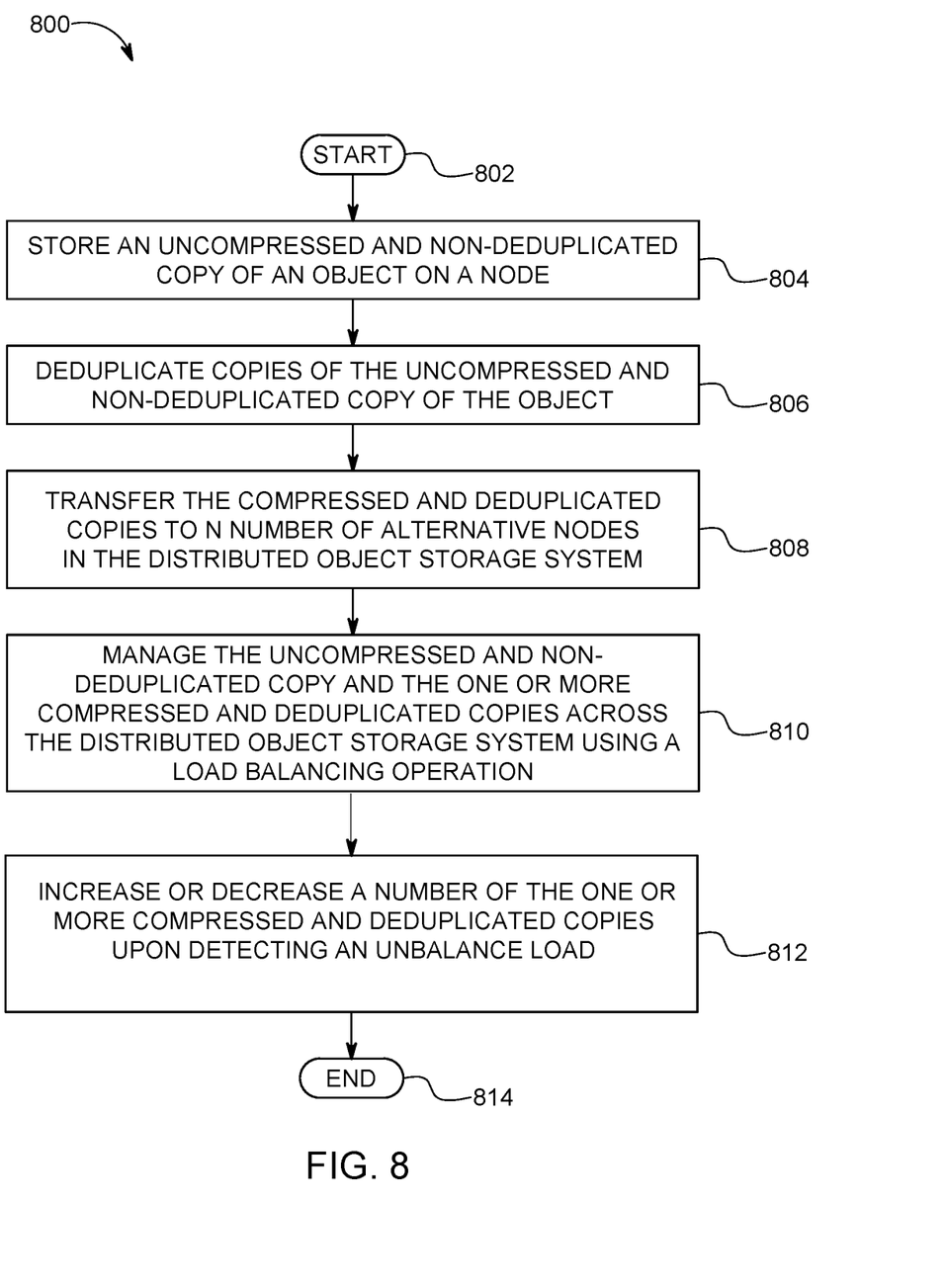
FIG. 8 is a flowchart diagram depicting an additional exemplary method for optimizing a deduplicated object storage system by one or more processors, again in which aspects of the present invention may be realized.

Turning now to FIG. 8, a method 800 for optimizing a deduplicated object storage system by one or more processors is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802. An uncompressed and non-deduplicated copy of an object on a node may be stored, as in block 804. Copies of the uncompressed and non-deduplicated copy of the object may be deduplicated, as in block 806. The compressed and deduplicated copies may be transferred to N number of alternative nodes in the distributed object storage system, as in block 808, where "N" is a selected value, numerical value, and/or positive integer. The uncompressed and non-deduplicated copy and the one or more compressed and deduplicated copies may be managed across the distributed object storage system using a load balancing operation, as in block 810. A number of the one or more compressed and deduplicated copies may be increased and/or decreased upon detecting an unbalance load, as in block 812. The functionality 800 may end, as in block 814.

In one aspect, in conjunction with and/or as part of at least one block of FIGS. 7 and 8, the operations of methods 700 and 800 may include each of the following. The operations of methods 700 and/or 800 may transfer the uncompressed and non-deduplicated copy of the object to the server prior to transferring the one or more compressed and deduplicated copies of the uncompressed and non-deduplicated copy of the object to the one or more remote servers in the distributed object storage system. The operations of methods 700 and/or 800 may manage the uncompressed and non-deduplicated copy and the one or more compressed and deduplicated copies across the distributed object storage system using a load balancing operation. A number of the one or more compressed and deduplicated copies may be increased upon detecting an unbalance load, and/or a number of the one or more compressed and deduplicated copies may be decreased upon detecting an unbalance load.

The uncompressed and non-deduplicated copy of an object may be used as a priority over the one or more compressed and deduplicated copies upon network transfer times differing between each of a plurality of nodes in the distributed object storage system. The uncompressed and non-deduplicated copy may be compressed if a decompression rate is such that a rate for reading the uncompressed and non-deduplicated copy is maintained.

The operations of methods 700 and/or 800 may deduplicate the uncompressed and non-deduplicated copy of the object if the uncompressed and non-deduplicated copy of the object is not accessed during a predetermined time period, and/or create the one or more compressed and deduplicated copies of the uncompressed and non-deduplicated copy of the object upon detecting the uncompressed and non-deduplicated copy of the object is accessed at least N number of times during a selected time period, wherein N may be a selected value, number, or positive integer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for optimized deduplicated object storage system by one or more processors, comprising:
   storing an uncompressed and non-deduplicated copy of an object on a node in a distributed object storage system and distributing one or more compressed and deduplicated copies of the uncompressed and non-deduplicated copy of the object on one or more alternative nodes in the distributed object storage system; and
   wherein the method further includes: deduplicating the uncompressed and non-deduplicated copy of the object if the uncompressed and non-deduplicated copy of the object is not accessed during a predetermined time period; or
   creating the one or more compressed and deduplicated copies of the uncompressed and non-deduplicated copy of the object upon detecting the uncompressed and non-deduplicated copy of the object is accessed at least N number of times during a selected time period, wherein N is a positive integer.

2. The method of claim 1, further including transferring the uncompressed and non-deduplicated copy of the object to the server prior to transferring the one or more compressed and deduplicated copies of the uncompressed and non-deduplicated copy of the object to the one or more remote servers in the distributed object storage system.

3. The method of claim 1, further including managing the uncompressed and non-deduplicated copy and the one or more compressed and deduplicated copies across the distributed object storage system using a load balancing operation, wherein access to the uncompressed and non-deduplicated copy of the object is prioritized and preferred over the one or more compressed and deduplicated copies.

4. The method of claim 1, further including:
   increasing a number of the one or more compressed and deduplicated copies upon detecting an unbalance load; or
   decreasing a number of the one or more compressed and deduplicated copies upon detecting an unbalance load.

5. The method of claim 1, further including using the uncompressed and non-deduplicated copy of an object as a priority over the one or more compressed and deduplicated copies upon network transfer times differing between each of a plurality of nodes in the distributed object storage system.

6. The method of claim 1, further including compressing the uncompressed and non-deduplicated copy if a decompression rate is such that a rate for reading the uncompressed and non-deduplicated copy is maintained.

7. A system for optimized deduplicated object storage system, comprising:
   one or more computers with executable instructions that when executed cause the system to:
      store an uncompressed and non-deduplicated copy of an object on a node in a distributed object storage system and distribute one or more compressed and deduplicated copies of the uncompressed and non-deduplicated copy of the object on one or more alternative nodes in the distributed object storage system; and
      wherein the executable instructions further: deduplicate the uncompressed and non-deduplicated copy of the object if the uncompressed and non-deduplicated copy of the object is not accessed during a predetermined time period; or
      create the one or more compressed and deduplicated copies of the uncompressed and non-deduplicated copy of the object upon detecting the uncompressed and non-deduplicated copy of the object is accessed at least N number of times during a selected time period, wherein N is a positive integer.

8. The system of claim 7, wherein the executable instructions transfer the uncompressed and non-deduplicated copy of the object to the server prior to transferring the one or more compressed and deduplicated copies of the uncompressed and non-deduplicated copy of the object to the one or more remote servers in the distributed object storage system.

9. The system of claim 7, wherein the executable instructions manage the uncompressed and non-deduplicated copy and the one or more compressed and deduplicated copies across the distributed object storage system using a load balancing operation, wherein access to the uncompressed and non-deduplicated copy of the object is prioritized and preferred over the one or more compressed and deduplicated copies.

10. The system of claim 7, wherein the executable instructions:
increase a number of the one or more compressed and deduplicated copies upon detecting an unbalance load; or
decrease a number of the one or more compressed and deduplicated copies upon detecting an unbalance load.

11. The system of claim 7, wherein the executable instructions use the uncompressed and non-deduplicated copy of an object as a priority over the one or more compressed and deduplicated copies upon network transfer times differing between each of a plurality of nodes in the distributed object storage system.

12. The system of claim 7, wherein the executable instructions compress the uncompressed and non-deduplicated copy if a decompression rate is such that a rate for reading the uncompressed and non-deduplicated copy is maintained.

13. A computer program product for optimized deduplicated object storage system by one or more processors, the computer program product comprising a non-transitory computer-readable storage medium having computer-readable program code portions stored therein, the computer-readable program code portions comprising:
an executable portion that stores an uncompressed and non-deduplicated copy of an object on a node in a distributed object storage system and distributes one or more compressed and deduplicated copies of the uncompressed and non-deduplicated copy of the object on one or more alternative nodes in the distributed object storage system; and
an executable portion that: deduplicates the uncompressed and non-deduplicated copy of the object if the uncompressed and non-deduplicated copy of the object is not accessed during a predetermined time period; or
creates the one or more compressed and deduplicated copies of the uncompressed and non-deduplicated copy of the object upon detecting the uncompressed and non-deduplicated copy of the object is accessed at least N number of times during a selected time period, wherein N is a positive integer.

14. The computer program product of claim 13, further including an executable portion that transfers the uncompressed and non-deduplicated copy of the object to the server prior to transferring the one or more compressed and deduplicated copies of the uncompressed and non-deduplicated copy of the object to the one or more remote servers in the distributed object storage system.

15. The computer program product of claim 13, further including an executable portion that manages the uncompressed and non-deduplicated copy and the one or more compressed and deduplicated copies across the distributed object storage system using a load balancing operation, wherein access to the uncompressed and non-deduplicated copy of the object is prioritized and preferred over the one or more compressed and deduplicated copies.

16. The computer program product of claim 13, further including an executable portion that:
increases a number of the one or more compressed and deduplicated copies upon detecting an unbalance load; or
decreases a number of the one or more compressed and deduplicated copies upon detecting an unbalance load.

17. The computer program product of claim 13, further including an executable portion that:
uses the uncompressed and non-deduplicated copy of an object as a priority over the one or more compressed and deduplicated copies upon network transfer times differing between each of a plurality of nodes in the distributed object storage system; or
compresses the uncompressed and non-deduplicated copy if a decompression rate is such that a rate for reading the uncompressed and non-deduplicated copy is maintained.

* * * * *